United States Patent
Sawadsky et al.

(10) Patent No.: US 7,366,743 B2
(45) Date of Patent: Apr. 29, 2008

(54) SYNCHRONOUS PEER-TO-PEER MULTIPOINT DATABASE SYNCHRONIZATION

(75) Inventors: Nicholas Justin Sawadsky, Vancouver (CA); Daniel (Yilin) Shi, Vancouver (CA); Andrew Edward Block, Vancouver (CA); Michael Anthony Blackstock, Coquitlam (CA); Henricus Gerardus Spaay, Vancouver (CA); Desiree Paula Rodriguez, Vancouver (CA)

(73) Assignee: Colligo Networks Inc., Vancouver, BC (CA)

( * ) Notice: Subject to any disclaimer, the term of this patent is extended or adjusted under 35 U.S.C. 154(b) by 0 days.

(21) Appl. No.: 11/196,567

(22) Filed: Aug. 2, 2005

(65) Prior Publication Data

US 2006/0015546 A1 Jan. 19, 2006

Related U.S. Application Data

(63) Continuation of application No. 10/090,613, filed on Mar. 6, 2002, now abandoned.

(51) Int. Cl.
*G06F 17/30* (2006.01)
*G06F 7/00* (2006.01)
(52) U.S. Cl. ...................... 707/204; 707/203
(58) Field of Classification Search ................ 707/204, 707/201, 203, 1, 200
See application file for complete search history.

(56) References Cited

U.S. PATENT DOCUMENTS

| | | | |
|---|---|---|---|
| 5,261,094 A | 11/1993 | Everson et al. | |
| 5,684,990 A | 11/1997 | Boothby | |
| 5,706,431 A | 1/1998 | Otto | |
| 5,737,601 A | 4/1998 | Jain et al. | |
| 5,806,075 A | 9/1998 | Jain et al. | |
| 5,870,765 A | 2/1999 | Bauer et al. | |
| 5,926,816 A | 7/1999 | Bauer et al. | |
| 5,970,502 A | 10/1999 | Salkewicz et al. | |
| 6,009,427 A | 12/1999 | Wolff | |
| 6,081,806 A | 6/2000 | Chang et al. | |
| 6,202,085 B1 * | 3/2001 | Benson et al. | 709/205 |
| 6,226,650 B1 | 5/2001 | Mahajan et al. | |
| 6,230,164 B1 | 5/2001 | Rekieta et al. | |
| 6,234,715 B1 | 5/2001 | Ono | |
| 6,243,717 B1 | 6/2001 | Gordon et al. | |
| 6,253,213 B1 | 6/2001 | Vanderschaaf | |
| 6,301,477 B1 | 10/2001 | Lennert et al. | |
| 6,304,881 B1 | 10/2001 | Halim et al. | |

(Continued)

OTHER PUBLICATIONS

Oracle7 Server Distributed Systems, vol. II: Replicated Data, Rel. 7.3, Feb. 1996 Oracle.*

(Continued)

*Primary Examiner*—Miranda Le
*Assistant Examiner*—Kuen S Lu
(74) *Attorney, Agent, or Firm*—Thelen Reid Brown Raysman & Steiner LLP

(57) ABSTRACT

A method of synchronizing databases between multiple users in a peer-to-peer network is disclosed. The method comprises extracting changes from a source database of one of the users. Next, the changes are compressed and sent to the other users in the peer-to-peer network in parallel. Finally, the changes are decompressed and replicated on the database of each of the other users. In this respect, the databases of the other users will contain all changes from the source database.

57 Claims, 7 Drawing Sheets

U.S. PATENT DOCUMENTS

| | | | |
|---|---|---|---|
| 6,311,187 B1 | 10/2001 | Jeyaraman | |
| 6,324,693 B1 | 11/2001 | Brodersen et al. | |
| 6,330,568 B1 | 12/2001 | Boothby et al. | |
| 6,374,262 B1* | 4/2002 | Kodama | 707/201 |
| 6,526,417 B1* | 2/2003 | Perry | 707/202 |
| 6,691,139 B2* | 2/2004 | Ganesh et al. | 707/204 |
| 6,704,737 B1* | 3/2004 | Nixon et al. | 707/101 |
| 2001/0014893 A1 | 8/2001 | Boothby | |
| 2002/0073109 A1* | 6/2002 | Toriumi | 707/204 |
| 2002/0103816 A1* | 8/2002 | Ganesh et al. | 707/204 |
| 2002/0147774 A1* | 10/2002 | Lisiecki et al. | 709/203 |
| 2003/0084361 A1* | 5/2003 | Lawrence et al. | 713/400 |

OTHER PUBLICATIONS

Oracle7â Server Distributed Systems, vol. II: Replicated Data, Release 7.3, Feb. 1996, Oracleâ.*

Definition: Collaborative Networks, from Wikipedia, Internet: http://en.wikipedia.org/wiki/Collaborative_networks, printed Dec. 21, 2006, 1 page.

Definition: Peer-to-Peer, from Wikipedia, Internet: http://en.wikipedia.org/wiki/P2p, printed Dec. 11, 2006, 9 pages.

Good, Robin, "P2P As Collaborative Networks," Kolabora News, Online collaboration—Internet: http://www.kolabora.com/news/2004/01/08/p2p_as_collaborative_networks.htm# (printed Dec. 21, 2006), Jan. 8, 2004, 3 pages.

Oracle 7 Server Distributed Systems, vol. II: Replicated Data, Rel. 7.3, Feb. 1996 Oracle.

* cited by examiner

SYNCHRONOUS PEER-TO-PEER MULTIPOINT DATABASE SYNCHRONIZATION

BACKGROUND OF THE INVENTION

The present invention generally relates to database synchronization and more particularly to a system and method of database synchronization over a peer-to-peer network.

With the popularity of handheld computing devices (i.e., PDA's, cell phones, etc . . . ) increasing, there is becoming a greater need and ability to share information between devices. Computing networks can be established between the devices so that collaborative information can be shared. The computing devices can form peer-to-peer networks between one another such that information can be shared without the use of a central server to store a database of information.

Currently, in the prior art, computers use databases stored on a central database server in order to communicate information. Database systems have replication and synchronization capabilities in order to update information on client systems. These synchronization capabilities are usually restricted to simple two-point exchanges between clients and servers. The synchronization and replication capability require the database server to effect dataset reconciliation between multiple users.

When multiple users without access to the database server wish to synchronize their databases, it must be done by a series of 2-way exchanges. For instance, information must flow in both directions between users in order to synchronize the dataset. At the very least, this involves 2*n combinations of replications and synchronization. As databases get large, the synchronization and replication procedures between the users becomes tedious and time consuming. Moreover, without the use of a central database server, one user must manage the entire process and ensure that all parties have been included in the synchronization and that data integrity is not lost.

U.S. Pat. No. 6,295,541, entitled "Systems and Methods for Synchronizing Two or More Datasets" describes a method whereby a reference database is maintained which the other devices synchronize to when available. The patent describes a system whereby devices synchronize to the reference database at different times when they are online such that synchronization occurs serially between devices. Furthermore, only one device is considered the reference database such that only one device controls the synchronization process.

The present invention addresses the above-mentioned deficiencies in database reconciliation by providing a peer-to-peer method for synchronizing two or more copies of databases without server mediation in real-time. In this respect, the present invention provides a method of synchronization wherein there is no asynchronous storage of interim reference datasets. The present invention provides synchronization in parallel so that several users can simultaneously synchronize individual varying datasets without having to serially exchange and aggregate changes. Furthermore, the present invention allows for any user to initiate synchronization such that one user does not need to be control.

BRIEF SUMMARY OF THE INVENTION

In accordance with the present invention, there is provided a method of synchronizing databases between multiple users in a peer-to-peer network. The method is initiated by one member of a group of peers. The other group members first extract their changes from their local copy of the database, compress the changes, and send those changes to the initiator. The initiator then decompresses their changes and replicates them into its local database. The initiator then extracts all changes (including those received from other group members) from the local database. Next, the changes are compressed and sent to the other users in the peer-to-peer network. Finally, the changes are decompressed and replicated on the database of each of the other users. In this respect, the databases of each group member will contain all changes from the databases of all the group members.

The above description describes a bilateral synchronization, in that changes are both sent and received from each peer. A unilateral synchronization is also possible, which consists of either the first half (receiving changes) or the second half (sending changes) of the above description. It will be recognized that the process can be initiated and performed by any user in the peer-to-peer network. In the preferred embodiment of the present invention, the transfer of the changes between the multiple users is done in parallel, although it may possibly be sequential. The transfer can be performed over a wired or wireless network.

In accordance with the present invention, there is also provided a system for synchronizing databases of multiple users. The system includes a plurality of computers in a peer-to-peer network wherein each computer has a database and software configured to provide synchronization. The software is configured to extract changes from the local database of each of the initiator's peers. The peers' changes are sent to the initiator in parallel as they finish being extracted. Each peer's changes are replicated into the initiator's database. Then all changes (including those received from the peers) are extracted from the initiator's database. Next, the software sends the changes in parallel to the other users of the peer-to-peer network. Finally, the changes are replicated by the software on each database of the other users in order to synchronize the databases.

BRIEF DESCRIPTION OF THE DRAWINGS

These as well as other features of the present invention will become more apparent upon reference to the drawings wherein.

DETAILED DESCRIPTION OF THE INVENTION

Figure 2:
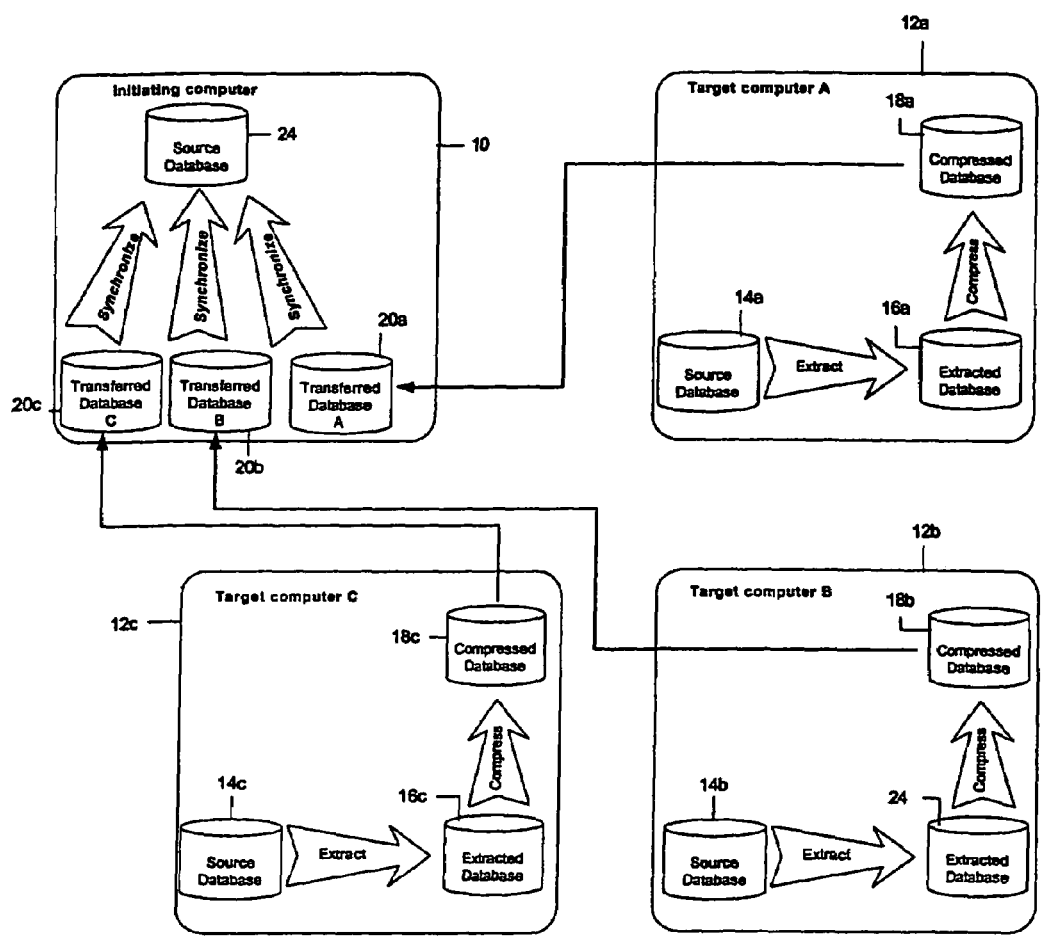
FIG. 2 is a diagram illustrating unilateral database replication from multiple target computers to the initiating computer.

Referring now to the drawings wherein the showings are for purposes of illustrating a preferred embodiment of the present invention only, and not for purposes of limiting the same, FIG. 2 shows unilateral database replication between an initiating computer 10 and target computers 12a, 12b and 12c according to the present invention. Both the initiating computer 10 and the target computers 12a, 12b, and 12c are computing devices having a memory and capable of storing and processing information. For instance the computing devices may be PDA's (i.e., Personal Digital Assistants) which are in electronic communication with one another through a peer-to-peer network. The network may be a wireless network such as Bluetooth, or could be a wired network such as an Ethernet. In either case, the peer-to-peer network provides electronic communication between the initiating computer 10 and the target computers 12 without the use of a server.

The initiating (source) computer 10 is synchronized with the other computers 12 by the transfer of database information from the target computers 12 to the initiating computer 10. As seen in FIG. 2, each of the target computers 12 transfer information to the initiating computer 10 in the same manner. Accordingly, the description below will be for the transfer of database information from target computer 12a to source computer 10, yet the process is identical for the transfers between target computers 12b and 12c to source computer 10. As will be further explained below, the processing and transfers may occur in parallel for each of the target computers 12a, 12b, and 12c to the initiating computer 10.

The process for synchronizing the target computers 12 to the initiating computer 10 begins by the initiating computer 16 sending out a synchronization request to the target computers 12. The synchronization command informs the target computers that the initiating computer 10 wishes to synchronize databases with them. It will be recognized that any computer in the network may be the initiating computer such that it is possible for any computer to start the synchronization process. The term initiating computer designates the computer that wishes the synchronization process to begin.

Figure 1:
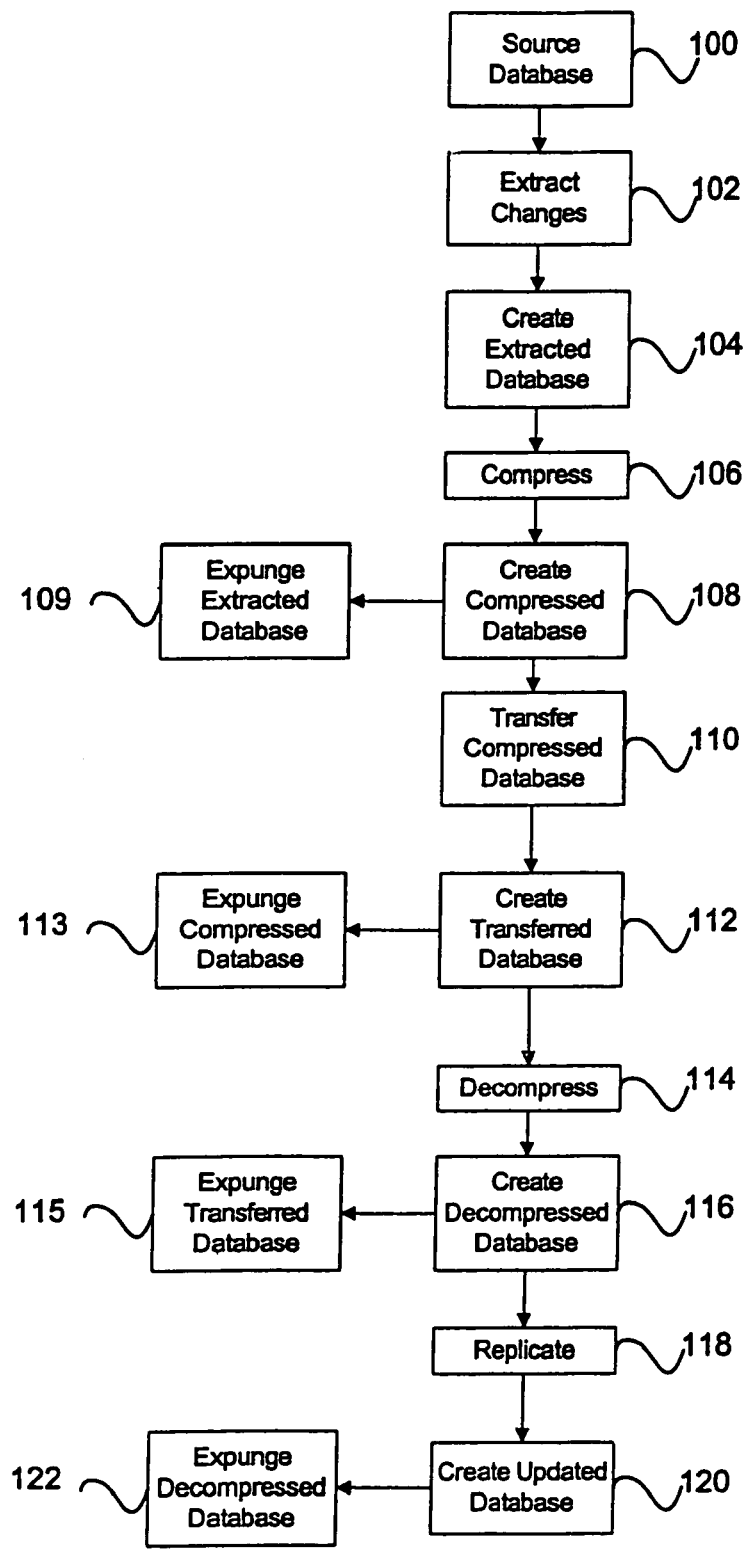
FIG. 1 is a flowchart illustrating a method of unilateral database synchronization from a target computer to an initiating computer according to the present invention.

Referring to FIGS. 1 and 2, in step 100, the target computer 12a has a source database 14a that is created in memory (i.e., hardrive, RAM, etc. . . . ). The source database 14a contains information which is shared between the target computer 12a and the other computing devices (i.e. computers 12b, 12c and 10). Next, in step 102, any changes to the source database 14a are extracted to create a temporary extracted database 16a containing at least all relevant changes to both the target computer 12a and the initiating computer 10. The extracted database 16a corresponds to the replica source 14a stored on the target computer 12a. All changes to the source database 14a from a user-specified date and time, or from the last time a synchronization occurred, are extracted and copied to the extracted database 16a. Accordingly, as seen in step 104, the extracted database 16a is created by extracting and copying the changes to the source database 14a. The extraction and copying is performed using the database API of the target computer 12a if such an API is available. In the case where no such API is available, changes are tracked as data is written to each database and extracted by the synchronization system itself.

Next, the extracted database 16a is compressed in step 106 to create a compressed database 18a in step 108. The compressed database 18a is created by using well known compression techniques on the extracted database 16a. Once the compressed database 18 is created, then the extracted database 16a is expunged in step 109.

Referring to step 110, the compressed database 18a is transferred to the initiating computer 10. Specifically, the file of the compressed database 18a is transferred to the initiating computer 10 in response to a request using any well known file transfer technique over any type of network, as previously described. Each of the target computers 12 will transfer information to the initiating computer 10 in parallel or in sequence when it is not possible to perform parallel communications. Typically, the compressed database 18a is transferred to a temporary transferred database 20a that is created on the initiating computer 10 in step 112. Once the transfer is complete, in step 113, the compressed database 18a on the target computer 12a is expunged.

Figure 4:
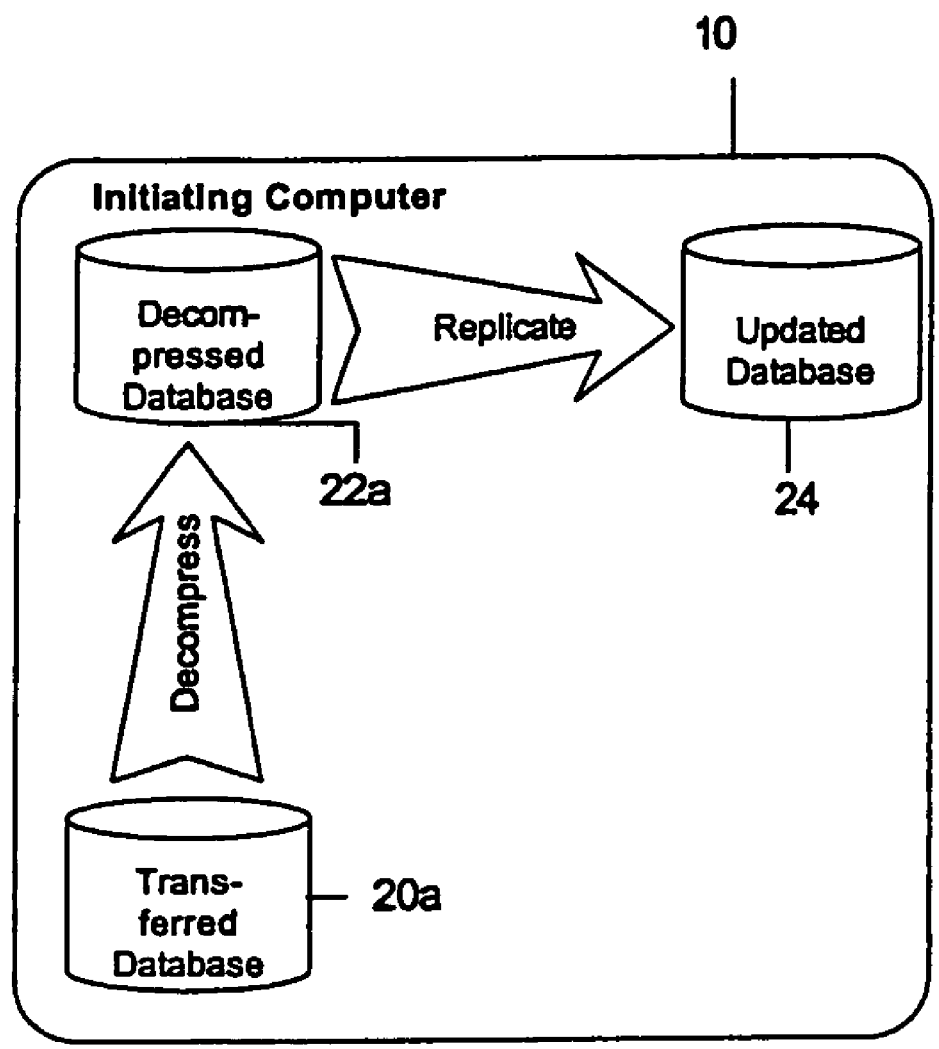
FIG. 4 illustrates the synchronization process on the initiating computer.

Once the transferred database 20a has been created on the initiating computer 10, the transferred database 20a is synchronized with the source database 24 of the initiating computer 10. Specifically, in step 114 of FIG. 1, the transferred database 20a is decompressed on the initiating computer 10, as seen in FIG. 4. The transferred database 20a is decompressed using a complementary decompression technique to that of step 106. Accordingly, in step 116, a decompressed database 22a is created on the initiating computer 10. Once the decompressed database 22a is created, then the transferred database 20a is expunged in step 115.

The decompressed database 22a is then replicated with the source database 24 of the initiating computer 10 in step 118. This operation is performed using the database API of the initiating computer 10 if such an API is available. In the case where no such API is available, replication is performed by the synchronization system itself. The process of replication causes the changes copied in the extracted database 16a to be incorporated into the source database 24 of the initiating computer 10. Once the decompressed database 22a is replicated onto the source database 24, the updated source database 24 is created in step 120 which has the changes and is identical to the source database 14a. Finally, the decompressed database 22a is expunged in step 122.

Each time a target computer 12 sends changes to the initiating computer 10, the synchronization process previously described (i.e., transfer, compression, decompression and replication) are completed in full before another synchronization from another target computer 12 is processed.

The above-described procedure is operative to send changes from the target computers 12 to an initiating computer 10. This procedure typically occurs when an initializing user wishes to receive changes from the other computers. However, the procedure can also be used if the initializing user wishes to transfer changes to other computers. In that instance, changes from the database of the initiating computer 10 would be transferred to the other computers 12a, 12b, and 12c.

Figure 3:
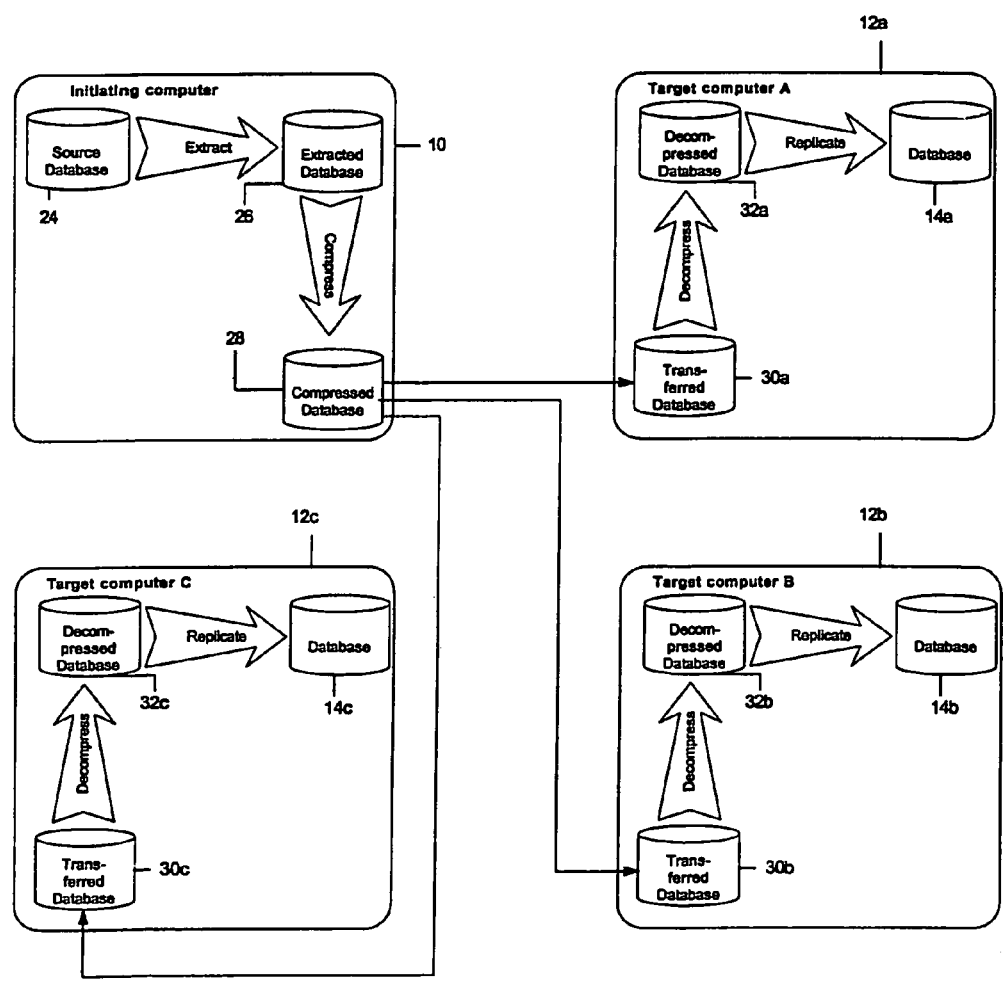
FIG. 3 is a diagram illustrating unilateral database replication from the initiating computer to multiple target computers.

Referring to FIG. 3, a diagram for the unilateral synchronization of multiple computers from the initiating computer 10 to target computers 12 is shown. Synchronization between the initiating computer 10 and target computers 12 occurs in parallel. Each target computer 12 has a transferred database, a decompressed database, and a target database that are created during the process of synchronization.

Figure 7:
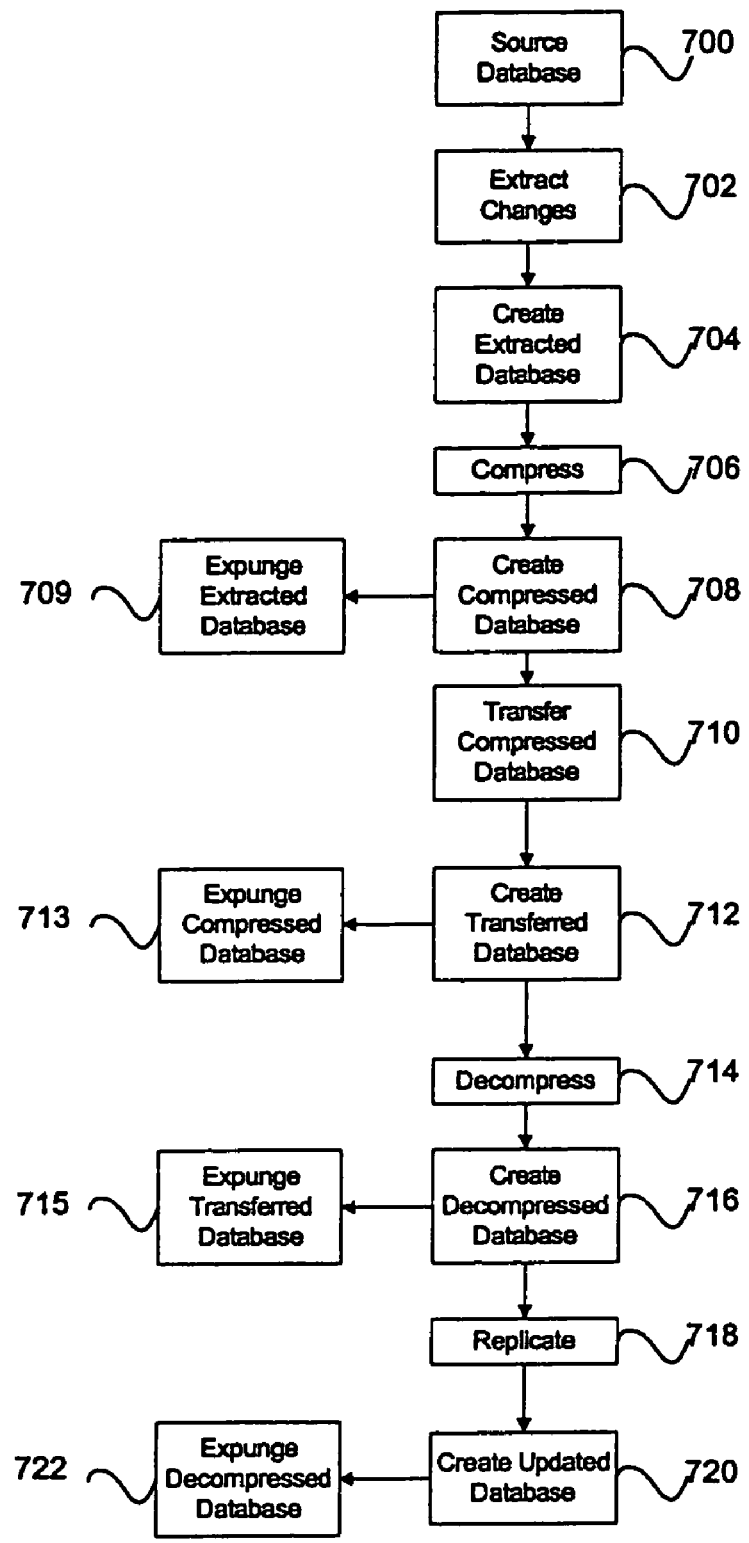
FIG. 7 is a flowchart illustrating a method of unilateral database synchronization from the initiating computer to the target computer.

Referring to FIGS. 3 and 7, the process for synchronizing the target computers 12 to the initiating computer 10 is similar to the process of synchronization described in FIG. 1. For example, the process begins with the initiating computer 10 sending a synchronization request to the target computers 12a, 12b, and 12c informing them that the initiating computer 10 wishes to send them changes to their databases. The synchronization process proceeds according to FIG. 7 such that changes in the source database 24 of the initiating computer 10 are extracted in step 702 to create an extracted database 26 in step 704. In step 706, the extracted database 26 is compressed to create a compressed database 28 in step 708. Once the compressed database 28 is created, the extracted database 26 is expunged in step 709. The compressed database 28 is transferred to the target computers 12a, 12b, and 12c in parallel over the computer network.

Each of the target computers 12a, 12b, and 12c receives the compressed database 28 and creates a respective transferred database 30a, 30b, and 30c. For simplicity, the following description will be for target computer 12a. However, it will be recognized that the following synchronization process occurs in any of the target computers (i.e., 12b, and 12c) synchronizing to the initiating computer 10. After the compressed database 28 is transferred and the transferred database 30a is created on the target computer 12a, then the compressed database 28 on the initiating computer 10 is expunged in step 713. In step 714, the compressed database 30a on the target computer 12a is decompressed to create a decompressed database 32a in step 716. The transferred database 30a is then expunged in step 715. The changes from the source database 24 are then replicated onto the database 14a of target computer 12a in step 718. In this regard, the database 14a will be updated with the changes from initiating computer 10, as seen in step 720. Finally, the decompressed database 32a is expunged from the target computer 12a.

The above-described method is concurrently performed on each of the target computers 12a, 12b, and 12c such that synchronization occurs simultaneously. Accordingly, the synchronization process of the present invention is a parallel method whereby each of the target computers 12 can synchronize with the initiating computer 10 quickly.

Figure 5:
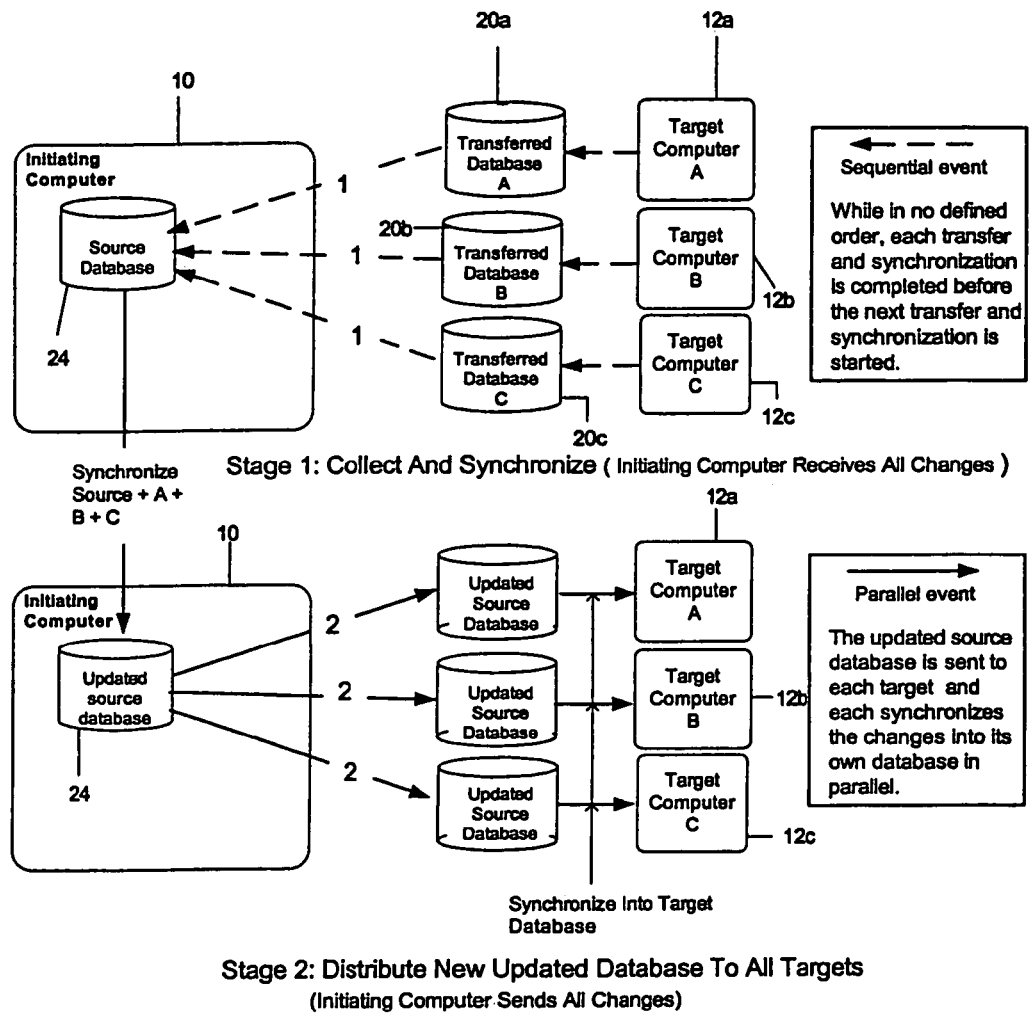
FIG. 5 is a diagram illustrating bilateral database replication between target computers and the initiating computer.

A bilateral database replication between an initiator and n peers consists of first n unilateral replications conducted in parallel to replicate all of the peers' changes into the initiator's database, followed by another n unilateral replications, again conducted in parallel, to replicate the accumulated changes from the initiator's database into the peers' local databases. Referring to FIG. 5, the initiating computer 10 receives changes from each of the target computers 12 in a sequential manner through the process described for FIG. 2. While in no defined order, each transfer and synchronization is completed before the next transfer and synchronization is started. For example, the synchronization process from target computer 12a to the transferred database 20a and synchronization to source database 24 will be completed before the next synchronization process from either target computer 12b or 12c. Once all of the target computers 12 have synchronized their changes to the source database 24, then the changes will be sent back to all of the target computers 12 in order to fully synchronize each target computer 12 to one another. Specifically, the source database 24 is now updated with the changes from each of the target computers 12. The initiating computer 10 will send all of its changes to the to the target computers 12 through a parallel manner as described for FIG. 3. The updated source database 24 is sent to each target computer 12 and each target computer 12 synchronizes the changes into it own database 14 in parallel. Accordingly, complete synchronization of all databases (i.e., initiating computer 10 and target computers 12) occurs in a two-stage process (bi-lateral exchange).

Even though the above-mentioned synchronization process for multiple computers has been described as being between an initiating and target computers, it will be recognized that any computer in the peer-to-peer network can begin the synchronization process. The computer that initiates the process will push and pull the transfer of files as needed. Furthermore, during multi-user synchronization, if any computer (other than the initiator) disappears from the network or cancels the process, the synchronization process can still proceed between the other computers.

Figure 6:
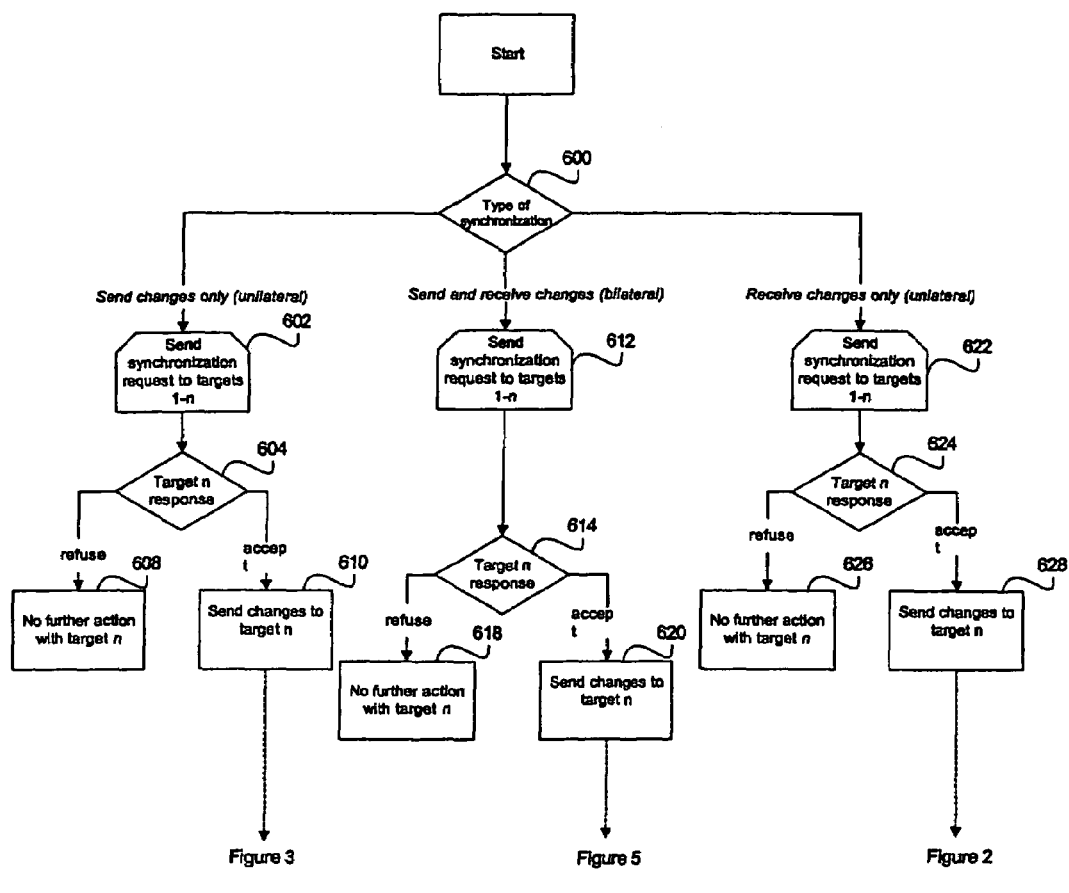
FIG. 6 is a diagram illustrating the selection of database replication techniques by a user.

Referring to FIG. 6, a flowchart showing possible synchronization processes is shown. As previously mentioned, either bilateral or unilateral synchronization between the initiating computer 10 and the target computers 12 can occur. The user determines the type of synchronization process in step 600 of FIG. 6. The user can send changes from the initiating computer as described for FIG. 3, receive and send changes as described for FIG. 5, or receive changes as described for FIG. 2. If the user decides to send changes only from the initiating computer 10 to target computers 12 (i.e., unilateral exchange), then in step 602, synchronization requests are sent from the initiating computer 10 to 1-n target computers 12. Next, each target computer 12 will respond to the request in step 604. Specifically, a target computer 12 can refuse the request such that synchronization does not occur. If the target computer 12 refuses, then in step 608, there is no further action with those target computers 12 which refuse synchronization. However, in step 610, target computers 12 which accept the synchronization request proceed to receive changes as previously described for FIG. 3.

If the user wishes to send and receive changes (i.e., indicating a bilateral exchange), then the initiating computer 10 will send the synchronization request to the 1-n target computers 12 as shown in step 612. Next, each of the target computers 12 will respond to the request by either refusing or accepting the request. If a target computer 12 refuses the request, then in step 618 no further action is taken with that target computer 12. However, if the target computer 12 accepts the request, then the bilateral synchronization process shown in FIG. 5 commences and the target computer 12 will begin sending changes to the initiating computer 10 and then proceed to receive all changes therefrom, as shown in step 620.

Referring to FIG. 6, if the user wishes just to receive changes only (i.e., unilateral exchange), then the initiating computer 10 will send the synchronization request to the target computers 12 in step 622. Next, the target computers 12 will respond in step 624. If a target computer 12 refuses to send changes to the initiating computer 10, then no further action will occur, as shown in step 626. However, if the target computer 12 agrees to the synchronization process, then in step 628, the changes are sent to the initiating computer as described for FIG. 2.

Additional modifications and improvements of the present invention may also be apparent to those of ordinary skill in the art. Thus, the particular combination of parts described and illustrated herein is intended to represent only a certain embodiment of the present invention, and not intended to serve as a limitation of alternative devices within the spirit and scope of the invention.

The invention claimed is:

1. A method for database synchronization, the method comprising:

extracting changes from a source database of a first computer of a peer-to-peer network to generate an extracted database, said peer-to-peer network comprising a plurality of computers,
  each of said plurality of computers configured to initiate and perform parallel synchronization of respective databases on each of said plurality of computers without mediation by a server and without asynchronous storage of interim reference data sets;
transferring said extracted database from said first computer to a second computer of said peer-to-peer network; and
replicating said source database on a target database of said second computer from said extracted database in order to synchronize said target database with said source database,
  wherein said extracting, said transferring, and said replicating occur without mediation by a server and without asynchronous storage of interim reference data sets.

2. The method of claim 1, further comprising:
compressing said extracted database to generate a compressed extracted database subsequent to said extracting; and
decompressing said compressed extracted database on said second computer to generate a decompressed extracted database subsequent to said transferring.

3. The method of claim 2, further comprising expunging said extracted database from said first computer after said compressed extracted database is generated.

4. The method of claim 2, further comprising expunging said compressed extracted database from said first computer after said transferring from said first computer to said second computer.

5. The method of claim 2, further comprising expunging said extracted database on said second computer after said decompressed database has been generated.

6. The method of claim 2, further comprising expunging said decompressed database on said second computer after it has been replicated on said target database.

7. The method of claim 2, wherein said decompressing comprises decompressing said compressed extracted database in a manner complementary to said compressing.

8. The method of claim 1, wherein said peer-to-peer network comprises a wireless network.

9. The method of claim 1, wherein said peer-to-peer network comprises a wired network.

10. The method of claim 1, further comprising:
extracting changes from said target database of said target computer to generate an extracted target database;
transferring said extracted target database from said second computer to said first computer; and
replicating said target database on said source database of said first computer from said extracted target database in order to synchronize said source database with said target database.

11. The method of claim 10, further comprising:
compressing said extracted target database to generate a compressed extracted target database subsequent to said extracting changes from said target database; and
decompressing said compressed extracted target database on said first computer to generate a decompressed target database subsequent to said transferring said extracted target database from said second computer.

12. The method of claim 1 wherein
said plurality of computers comprises an initiating computer; and
said extracting is responsive to receiving a synchronization request from said initiating computer.

13. A method for database synchronization, the method comprising:
extracting changes from a respective database of each of a plurality of users in a peer-to-peer network, said peer-to-peer network comprising a plurality of computers,
  each of said plurality of computers configured to initiate and perform parallel synchronization of respective databases on each of said plurality of computers without mediation by a server and without asynchronous storage of interim reference data sets, one of said plurality of users being an initiating user;
sending said changes from each of said users to said initiating user;
replicating said changes from each of said users onto said database of said initiating user;
sending said changes on said database of said initiating user to each of said other users; and
replicating said changes on a respective database of each user in order to synchronize said databases of all of said users,
  wherein said extracting, said sending said changes from each of said users, said replicating said changes from each of said users, said sending said changes on said database, and
  said replicating said changes on a respective database occur without mediation by a server and without asynchronous storage of interim reference data sets.

14. The method of claim 13, further comprising compressing said changes prior to sending them and decompressing said changes after being received.

15. The method of claim 13 wherein:
said extracting further comprises creating a transferred database from said changes to each respective database of said users;
said sending said changes from each of said users further comprises compressing and sending said transferred database as said changes to said initiating user; and
said replicating said changes from each of said users further comprises decompressing said transferred database in order to replicate said changes to said database of said initiating user.

16. The method of claim 13 wherein:
said sending said changes on said database further comprises creating a transferred database from said changes to said database of said initiating user and then compressing and sending said transferred database as said changes to each of said databases of each of said users; and
said replicating said changes on a respective database further comprises decompressing said transferred database by each of said users in order to replicate said changes of all said users on each of said user's databases.

17. The method of claim 13 wherein said sending said changes on said database further comprises transferring said changes on said database in parallel to each of said users.

18. The method of claim 13 wherein said extracting is responsive to receiving a synchronization request from said initiating user.

19. A memory comprising processing information for database synchronization, the processing information operable to, when executed by a computer, cause the computer to:
extract changes from a source database of a first computer of a peer-to-peer network to generate an extracted database, said peer-to-peer network comprising a plurality of computers, each of said plurality of computers configured to initiate and perform parallel synchronization of respective databases on each of said plurality of computers without mediation by a server and without asynchronous storage of interim reference data sets;

transfer said extracted database from said first computer to a second computer of said peer-to-peer network; and replicate said source database on a target database of said second computer from said extracted database in order to synchronize said target database with said source database, wherein said extracting, said transferring, and said replicating occur without mediation by a server and without asynchronous storage of interim reference data sets.

20. The memory of claim 19 wherein said processing information further operable to, when executed by the computer, cause the computer to:

compress said extracted database to generate a compressed extracted database subsequent to said extracting; and decompress said compressed extracted database on said second computer to generate a decompressed extracted database subsequent to said transferring.

21. The memory of claim 20 wherein said processing information is further operable to, when executed by the computer, cause the computer to expunge said extracted database from said first computer after said compressed extracted database is generated.

22. The memory of claim 20 wherein said processing information is further operable to, when executed by the computer, cause the computer to expunge said compressed extracted database from said first computer after said transferring from said first computer to said second computer.

23. The memory of claim 20 wherein said processing information is further operable to, when executed by the computer, cause the computer to expunge said extracted database on said second computer after said decompressed database has been generated.

24. The memory of claim 20 wherein said processing information is further operable to, when executed by the computer, cause the computer to expunge said decompressed database on said second computer after it has been replicated on said target database.

25. The memory of claim 20 wherein said processing information is further operable to, when executed by the computer, cause the computer to decompress said compressed extracted database in a manner complementary to said compressing.

26. The memory of claim 19 wherein said peer-to-peer network comprises a wireless network.

27. The memory of claim 19 wherein said peer-to-peer network comprises a wired network.

28. The memory of claim 19 wherein said processing information is further operable to, when executed by the computer, cause the computer to:

extract changes from said target database of said target computer to generate an extracted target database; transfer said extracted target database from said second computer to said first computer; and replicate said target database on said source database of said first computer from said extracted target database in order to synchronize said source database with said target database.

29. The memory of claim 28 wherein said processing information is further operable to, when executed by the computer, cause the computer to:

compress said extracted target database to generate a compressed extracted target database subsequent to said extracting changes from said target database; and decompress said compressed extracted target database on said first computer to generate a decompressed target database subsequent to said transferring said extracted target database from said second computer.

30. The memory of claim 19 wherein said plurality of computers comprises an initiating computer; and said extracting is responsive to receiving a synchronization request from said initiating computer.

31. A memory comprising processing information for database synchronization, the processing information operable to, when executed by a computer, cause the computer to:

extract changes from a respective database of each of a plurality of users in a peer-to-peer network, said peer-to-peer network comprising a plurality of computers, each of said plurality of computers configured to initiate and perform parallel synchronization of respective databases on each of said plurality of computers without mediation by a server and without asynchronous storage of interim reference data sets, one of said plurality of users being an initiating user;

send said changes from each of said users to said initiating user;

replicate said changes from each of said users onto said database of said initiating user;

send said changes on said database of said initiating user to each of said other users; and replicate said changes on a respective database of each user in order to synchronize said databases of all of said users, wherein said extracting, said sending said changes from each of said users, said replicating said changes from each of said users, said sending said changes on said database, and said replicating said changes on a respective database occur without mediation by a server and without asynchronous storage of interim reference data sets.

32. The memory of claim 31 wherein said processing information is further operable to, when executed by the computer, cause the computer to compress said changes prior to sending them and decompress said changes after being received.

33. The memory of claim 31 wherein said processing information is further operable to, when executed by the computer, cause the computer to:

create a transferred database from said changes to each respective database of said users;

compress and send said transferred database as said changes to said initiating user; and decompress said transferred database in order to replicate said changes to said database of said initiating user.

34. The memory of claim 31 wherein said processing information is further operable to, when executed by the computer, cause the computer to:

create a transferred database from said changes to said database of said initiating user and then compressing and sending said transferred database as said changes to each of said databases of each of said users; and decompress said transferred database by each of said users in order to replicate said changes of all said users on each of said user's databases.

35. The memory of claim 31 wherein said processing information is further operable to, when executed by the computer, cause the computer to transfer said changes on said database in parallel to each of said users.

36. The memory of claim 31 wherein said processing information is further operable to, when executed by the computer, cause the computer to extract said changes in response to receiving a synchronization request from said initiating user.

37. An apparatus for database synchronization, the apparatus comprising:
means for extracting changes from a source database of a first computer of a peer-to-peer network to generate an extracted database;
means for transferring said extracted database from said first computer to a second computer of said peer-to-peer network; and
means for replicating said source database on a target database of said second computer from said extracted database in order to synchronize said target database with said source database,
wherein said extracting, said transferring, and said replicating occur without mediation by a server and without asynchronous storage of interim reference data sets.

38. The apparatus of claim 37, further comprising:
means for compressing said extracted database to generate a compressed extracted database subsequent to said extracting; and
means for decompressing said compressed extracted database on said second computer to generate a decompressed extracted database subsequent to said transferring.

39. The apparatus of claim 38, further comprising means for expunging said extracted database from said first computer after said compressed extracted database is generated.

40. The apparatus of claim 38, further comprising means for expunging said compressed extracted database from said first computer after said transferring from said first computer to said second computer.

41. The apparatus of claim 38, further comprising means for expunging said extracted database on said second computer after said decompressed database has been generated.

42. The apparatus of claim 38, further comprising means for expunging said decompressed database on said second computer after it has been replicated on said target database.

43. The apparatus of claim 38 wherein said means for decompressing comprises means for decompressing said compressed extracted database in a manner complementary to said compressing.

44. The apparatus of claim 37 wherein said peer-to-peer network comprises a wireless network.

45. The apparatus of claim 37 wherein said peer-to-peer network comprises a wired network.

46. The apparatus of claim 37, further comprising:
means for extracting changes from said target database of said target computer to generate an extracted target database;
means for transferring said extracted target database from said second computer to said first computer; and
means for replicating said target database on said source database of said first computer from said extracted target database in order to synchronize said source database with said target database.

47. The apparatus of claim 46, further comprising:
means for compressing said extracted target database to generate a compressed extracted target database subsequent to said extracting changes from said target database; and
means for decompressing said compressed extracted target database on said first computer to generate a decompressed target database subsequent to said transferring said extracted target database from said second computer.

48. The apparatus of claim 37 wherein
said plurality of computers comprises an initiating computer; and
said means for extracting is responsive to receiving a synchronization request from said initiating computer.

49. An apparatus for database synchronization, the apparatus comprising:
means for extracting changes from a respective database of each of said a plurality of users in a peer-to-peer network, one of said plurality of users being an initiating user;
means for sending said changes from each of said users to said initiating user;
means for replicating said changes from each of said users onto said database of said initiating user;
means for sending said changes on said database of said initiating user to each of said other users; and
means for replicating said changes on a respective database of each user in order to synchronize said databases of all of said users,
wherein said extracting, said sending said changes from each of said users,
said replicating said changes from each of said users,
said sending said changes on said database, and
said replicating said changes on a respective database occur without mediation by a server and without asynchronous storage of interim reference data sets.

50. The apparatus of claim 49, further comprising means for compressing said changes prior to sending them and decompressing said changes after being received.

51. The apparatus of claim 49 wherein:
said means for extracting further comprises means for creating a transferred database from said changes to each respective database of said users;
said means for sending said changes from each of said users further comprises means for compressing and sending said transferred database as said changes to said initiating user; and
said means for replicating said changes from each of said users further comprises means for decompressing said transferred database in order to replicate said changes to said database of said initiating user.

52. The apparatus of claim 49 wherein:
said means for sending said changes on said database further comprises means for creating a transferred database from said changes to said database of said initiating user and then compressing and sending said transferred database as said changes to each of said databases of each of said users; and
said means for replicating said changes on a respective database further comprises means for decompressing said transferred database by each of said users in order to replicate said changes of all said users on each of said user's databases.

53. The apparatus of claim 49 wherein said means for sending said changes on said database further comprises means for transferring said changes on said database in parallel to each of said users.

54. The apparatus of claim 49 wherein said means for extracting is responsive to receiving a synchronization request from said initiating user.

55. A system for database synchronization, the system comprising:
 a plurality of computers in a peer-to-peer network,
  wherein one of said computers is designated an initiating computer,
  each of said plurality of computers configured to initiate and perform parallel synchronization of respective databases on each of said plurality of computers,
  each of said plurality of computers having a database and configured to,
  without mediation by a server and without asynchronous storage of interim reference data sets:
 extract changes from a source database of each computer of said users;
 send changes from each of said user's computers in said peer-to-peer network to said initiating replicate said changes from each of said databases of said user's computers onto said database of said initiating computer;
 extract all of said changes from said database of said initiating computer; and
 replicate said changes on a respective database of each of said users in order to synchronize all databases.

56. The system of claim 55 wherein each of said plurality of computers is configured to send said changes to said other users in parallel.

57. The system of claim 55 wherein each of said plurality of computers is further configured to extract said changes from said source database in response to receiving a synchronization request from said initiating computer.

* * * * *